United States Patent [19]

Baer

[11] 4,192,307
[45] Mar. 11, 1980

[54] PACIFIER WITH SWEETS-DISPENSING NIPPLE

[76] Inventor: Alan R. Baer, 14926 Plank Rd., Union Grove, Wis. 53182

[21] Appl. No.: 911,275

[22] Filed: May 31, 1978

[51] Int. Cl.² .................... A61J 11/00; A61J 17/00
[52] U.S. Cl. ................................ 128/252; 128/360
[58] Field of Search ............. 128/252, 360, 272, 233, 128/359; 215/11 R, 272

[56] References Cited

U.S. PATENT DOCUMENTS

| 1,287,295 | 12/1918 | Guenther | 128/360 |
| 2,834,350 | 5/1958 | Beck, Jr. et al. | 128/360 |
| 2,889,829 | 6/1959 | Tannenbaum | 215/11 R |
| 3,392,729 | 7/1968 | Lenoir | 128/360 |
| 3,556,104 | 1/1971 | Janklow | 128/360 |
| 4,065,035 | 12/1977 | Eissler | 220/375 X |
| 4,132,225 | 1/1977 | Whattam | 220/375 X |

*Primary Examiner*—Robert W. Michell
*Assistant Examiner*—Milford Juten
*Attorney, Agent, or Firm*—Axel H. Johnson

[57] ABSTRACT

A pacifier for infants, having a nipple provided with a chamber, the wall of which has perforations. In use, the chamber is supplied with flavored sweets such as pellets of candy, of frozen fruit juices. When the nipple is then placed in the infant's mouth, saliva therein circulates through the perforations thereof and the resulting sweetened fluid flowing therethrough encourages the infant to retain the nipple in its mouth and not eject it.

3 Claims, 4 Drawing Figures

PACIFIER WITH SWEETS-DISPENSING NIPPLE

BACKGROUND OF THE INVENTION

1. Field of the Invention

This invention concerns a pacifier having a chambered nipple which has perforations to permit sweets contained therein to be slowly disolved in the saliva of the infant.

2. Description of the Prior Art

The Prior Art comprises pacifiers composed solely of imperforate nipples carried by a suitable ring or handle and including a safety guard.

SUMMARY OF THE INVENTION

This invention concerns a pacifier that encourages the infant to retain the nipple in its mouth because the saliva therein disolves the sweets stored in the nipple.

Referring to the drawing.

Figure 2:
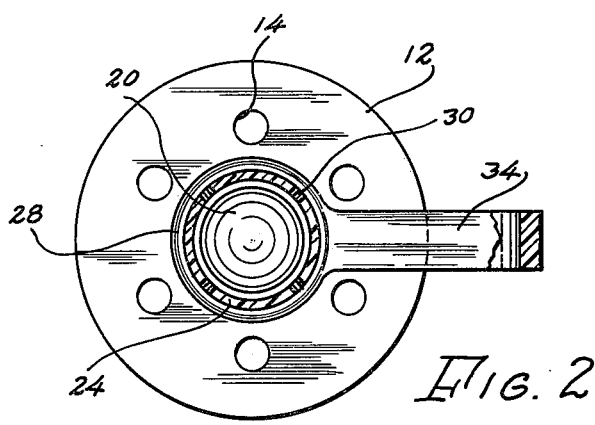
FIG. 2 is a top axial view, taken at 2—2 of FIG. 1.

The pacifier of this invention is strictly of a unitary one piece construction and of a flexible, soft and molded plastic material which is sanitary and not apt to cause injury. It comprises an axial body portion 10 and a safety guard 12 to abut the lips of the infant, and is also provided with a plurality of ventilating holes 14. A ring-shaped handle 16 is integral with body portion 10. A sealing plug 20 having a circumferential sealing ring 22 is positioned integrally with body portion 10 and of the shape shown.

Nipple 24 is preferably of the shape shown, and has a chamber terminating downwardly in an opening 26. A peripheral enlargement or ring portion 28 is provided in nipple 24, and owning to the flexibility of the nipple, permits the latter to be expanded and securely positioned over the sealing ring 22 of the plug 20. The nipple 24 is provided with a plurality of small peripheral perforations 30 uniformly spaced over the surface of the nipple. An axially-positioned perforation 32 is also provided.

A flexible hinge or strap 34 of the shape shown is integral with body portion 10, freely surrounding guard 12 and terminating integrally with peripheral ring 28 of nipple 24.

Figure 1:
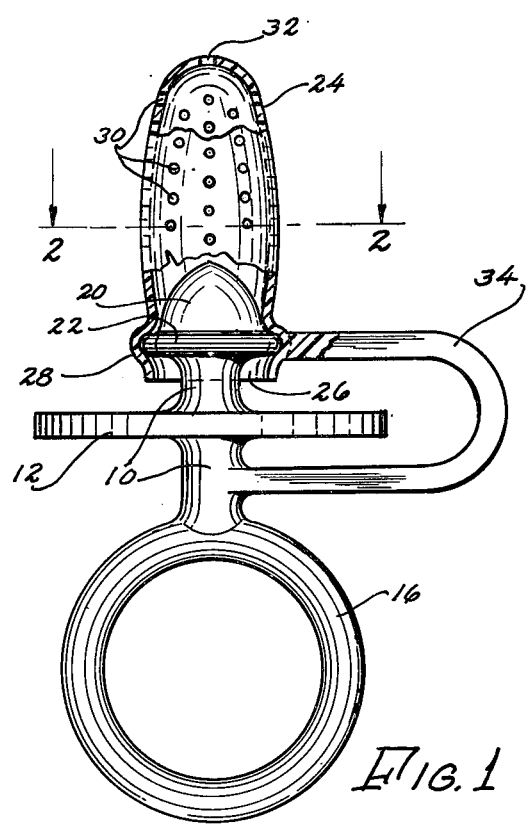
FIG. 1 is an elevational view of the pacifier of this invention, assembled and ready for use, and partly in section.
Figure 3:
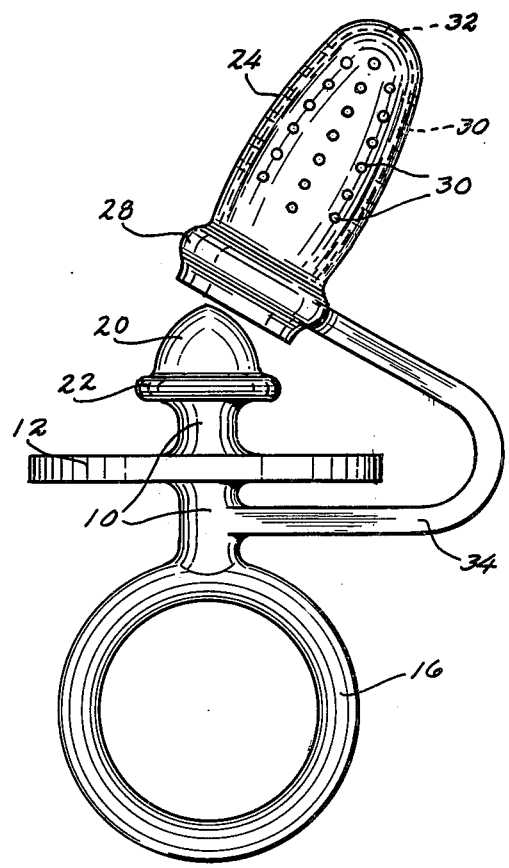
FIG. 3 is a view similar to FIG. 1, but with the nipple hinged up to permit the storing of sweets therein.
Figure 4:
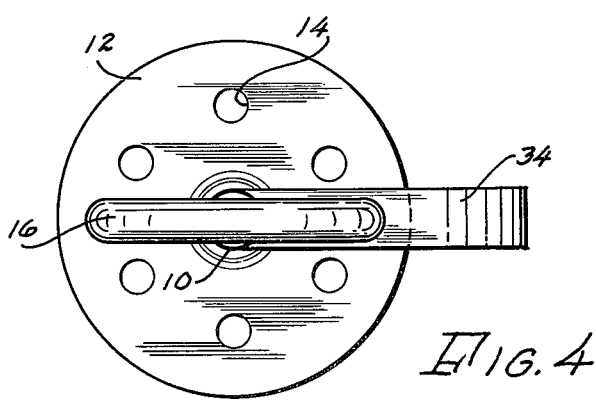
FIG. 4 is an axial view from below FIG. 1.

When this pacifier is being prepared for use, the nipple 24 is filled with the desired sweets through opening 26, and then positioned on plug 20 as shown in FIG. 1, so that sealing ring 22 receives the nipple 24 securely in position by engagement with ring 28. The nipple is then ready to be placed in the infant's mouth, and the saliva released will gradually flow through the perforations 30 and 32, and disolve the sweets stored in the nipple 24.

The above being a complete description of an illustrative embodiment of the invention, what is claimed as new and desired to be secured by Letters Patent of the United States is:

1. A pacifier of pliable molded material and strictly of one piece unitary construction, and having an axial body, comprising a guard integral with said body and lying in a plane normal thereto, a nipple having a chamber, and provided with a plurality of perforations peripherally-positioned on the surface thereof, said chamber terminating in an axial opening, a sealing plug integral with said body and axially co-operating to seal said opening, and a strap intimately integral with said nipple as one piece with said body.

2. A pacifier as set forth in claim 1, in which said sealing plug has a circumferential sealing ring to engage the opening of said nipple.

3. A pacifier as set forth in claim 2, in which said axial opening of said nipple has an internal circumferential groove to engage said sealing ring.

* * * * *